(12) United States Patent
Lee et al.

(10) Patent No.: US 12,539,557 B2
(45) Date of Patent: Feb. 3, 2026

(54) ULTRASONIC WELDING APPARATUS AND ULTRASONIC WELDING METHOD

(71) Applicant: LG ENERGY SOLUTION, LTD., Seoul (KR)

(72) Inventors: Jin Yong Lee, Daejeon (KR); Hun Bum Jung, Daejeon (KR); Min Cheol Park, Daejeon (KR); Jong Baek Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 42 days.

(21) Appl. No.: 18/031,508

(22) PCT Filed: Jul. 18, 2022

(86) PCT No.: PCT/KR2022/010461
§ 371 (c)(1),
(2) Date: Apr. 12, 2023

(87) PCT Pub. No.: WO2023/008802
PCT Pub. Date: Feb. 2, 2023

(65) Prior Publication Data
US 2023/0381886 A1    Nov. 30, 2023

(30) Foreign Application Priority Data
Jul. 29, 2021 (KR) .................. 10-2021-0099891

(51) Int. Cl.
*B23K 20/26* (2006.01)
*B23K 20/10* (2006.01)
*B23K 101/38* (2006.01)

(52) U.S. Cl.
CPC .............. *B23K 20/26* (2013.01); *B23K 20/10* (2013.01); *B23K 2101/38* (2018.08)

(58) Field of Classification Search
None
See application file for complete search history.

(56) References Cited

U.S. PATENT DOCUMENTS 6,491,785 B1 * 12/2002 Sato ..................... H01L 24/75
228/1.1
6,620,270 B2 * 9/2003 Ehlert ............... B29C 66/83413
156/580.2

(Continued)

FOREIGN PATENT DOCUMENTS

DE    10 2013 222 876 A1    5/2014
DE       102016110590 A1    12/2016

(Continued)

OTHER PUBLICATIONS

Japanese Office Action for Japanese Application No. 2023-522438, dated May 28, 2024, with an English translation.

(Continued)

*Primary Examiner* — Devang R Patel
(74) *Attorney, Agent, or Firm* — Birch, Stewart, Kolasch & Birch, LLP

(57) ABSTRACT

An ultrasonic welding apparatus includes: a pressing force measuring anvil including a pressing force measuring sensor; a horn which is installed to vertically move above the pressing force measuring anvil and presses the pressing force measuring anvil when moving downward; a horn down stroke adjustment part that adjusts a down stroke of the horn so that a pressing force of the horn is within a preset pressing force range; and a welding anvil on which welding target members to be welded by the horn are and supportable by the welding anvil and of which a position is changed to a position of the pressing force measuring anvil so that the welding anvil is positioned under the horn after the down stroke of the horn is adjusted to be within the preset pressing force range.

13 Claims, 13 Drawing Sheets

(56) References Cited

U.S. PATENT DOCUMENTS

| | | | | |
|---|---|---|---|---|
| 8,439,247 | B1* | 5/2013 | Spicer | B29C 66/8242 |
| | | | | 228/110.1 |
| 8,858,742 | B2* | 10/2014 | Spicer | B23K 20/10 |
| | | | | 156/359 |
| 9,618,410 | B2* | 4/2017 | Spicer | G01L 5/16 |
| 9,658,612 | B2* | 5/2017 | Spicer | B23K 20/10 |
| 10,105,789 | B2* | 10/2018 | Wang | B29C 66/92921 |
| 10,363,646 | B2* | 7/2019 | Lee | G05B 19/00 |
| 2014/0203066 | A1 | 7/2014 | Cai et al. | |
| 2015/0165673 | A1 | 6/2015 | Spicer et al. | |
| 2020/0108593 | A1 | 4/2020 | Lafferty et al. | |
| 2020/0227877 | A1 | 7/2020 | Nakamura et al. | |
| 2021/0098766 | A1 | 4/2021 | Ban et al. | |

FOREIGN PATENT DOCUMENTS

| | | | | |
|---|---|---|---|---|
| DE | 10 2015 221 615 A1 | | 5/2017 | |
| DE | 10 2017 205 024 A1 | | 9/2018 | |
| EP | 3459674 A1 * | | 3/2019 | B23K 20/004 |
| JP | 10-71651 A | | 3/1998 | |
| JP | 10-284532 A | | 10/1998 | |
| JP | 2001-167751 A | | 6/2001 | |
| JP | 3447982 B2 | | 9/2003 | |
| JP | 2007-144485 A | | 6/2007 | |
| JP | 2010-201481 A | | 9/2010 | |
| JP | 5412617 B2 | | 2/2014 | |
| JP | 2019-18226 A | | 2/2019 | |
| JP | 2019018226 A * | | 2/2019 | B23K 20/10 |
| KR | 10-0604328 B1 | | 7/2006 | |
| KR | 10-2013-0036104 A | | 4/2013 | |
| KR | 10-2013-0055424 A | | 5/2013 | |
| KR | 10-2006806 B1 | | 8/2019 | |
| KR | 10-2020-0075856 A | | 6/2020 | |
| KR | 10-2020-0107280 A | | 9/2020 | |
| KR | 10-2021-0037902 A | | 4/2021 | |

OTHER PUBLICATIONS

International Search Report (PCT/ISA/210) issued in PCT/KR2022/010461, dated Oct. 26, 2022.

Extended European Search Report for European Application No. 22849778.0, dated Feb. 26, 2024.

European Communication pursuant to Article 94(3) EPC for European Application No. 22849778.0, dated Nov. 24, 2025.

* cited by examiner

[FIG. 1]  CONVENTIONAL ART
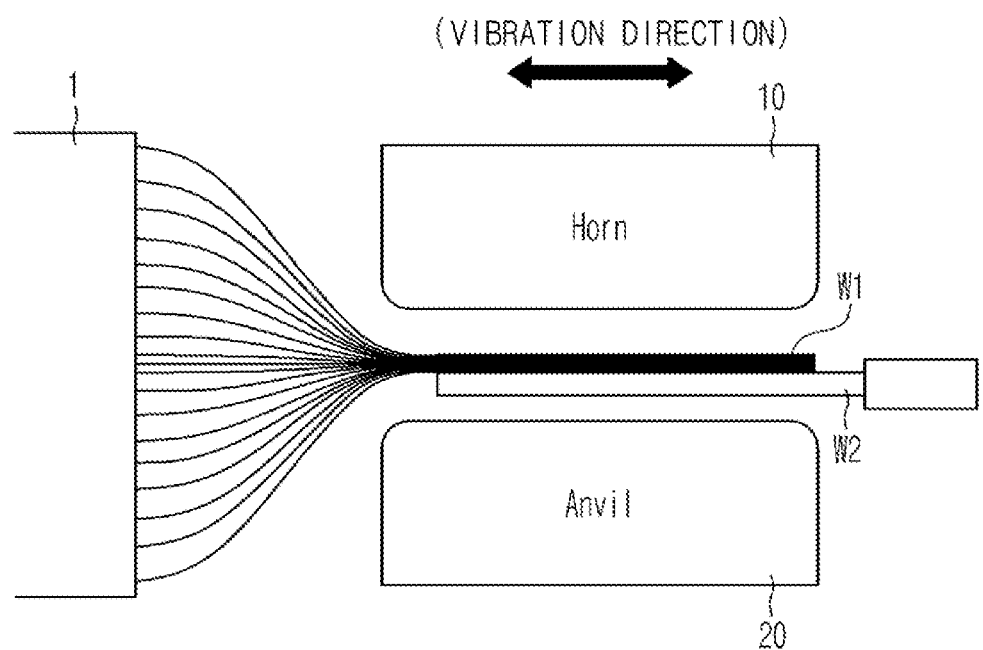

[FIG. 2]
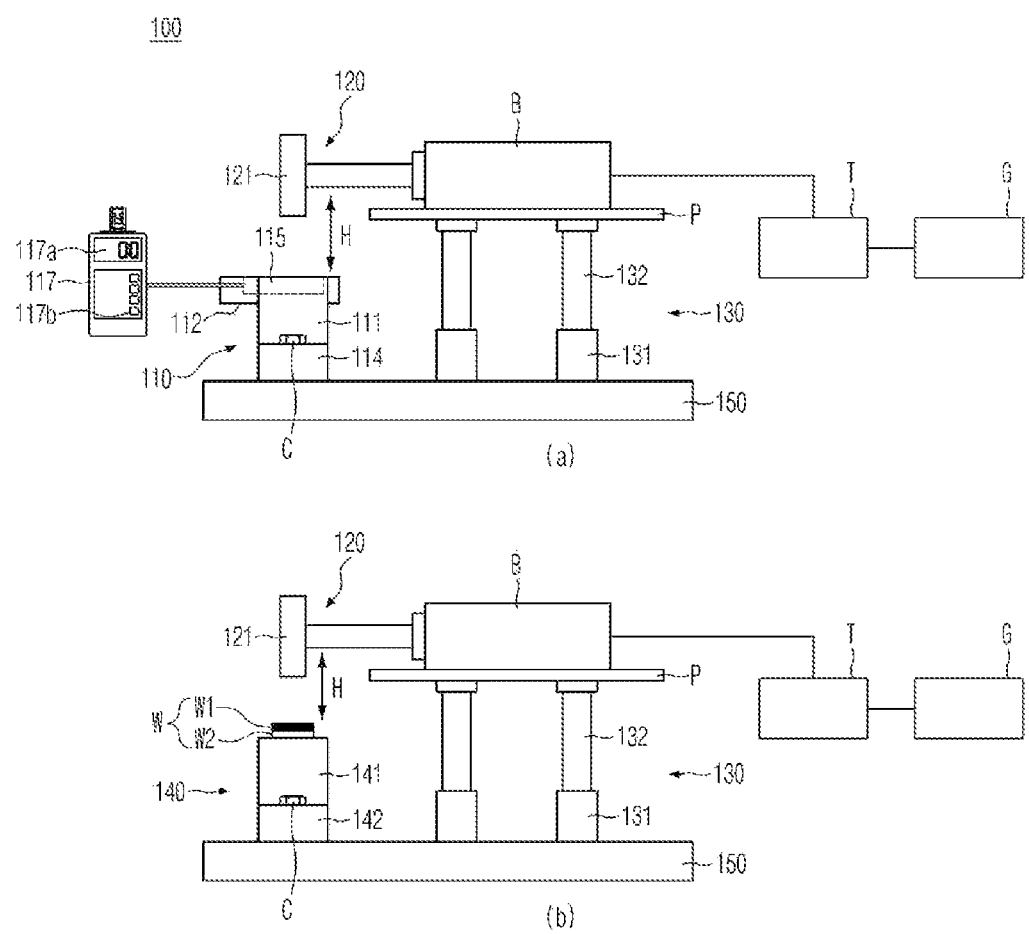

[FIG. 3]
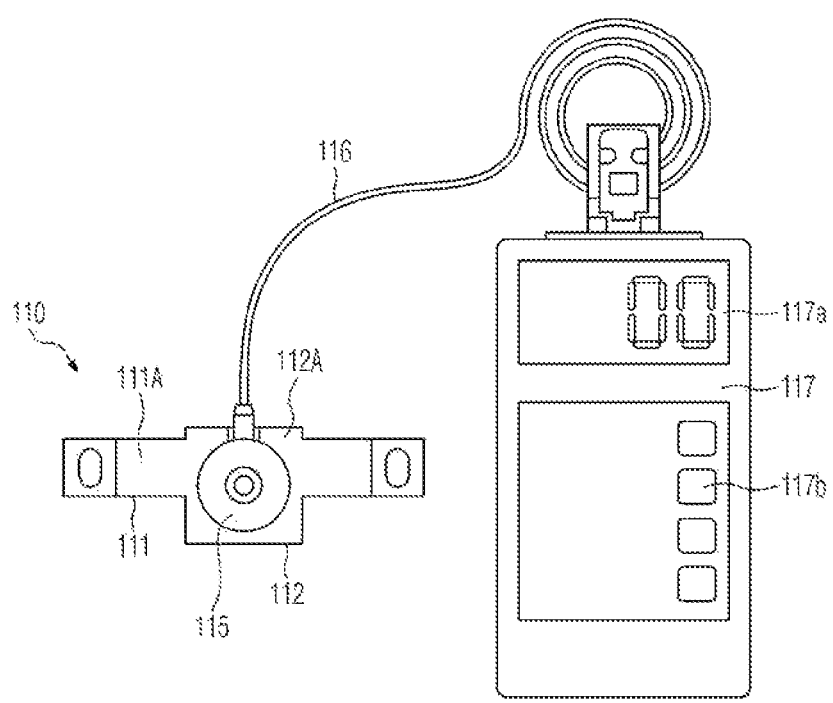

[FIG. 4]
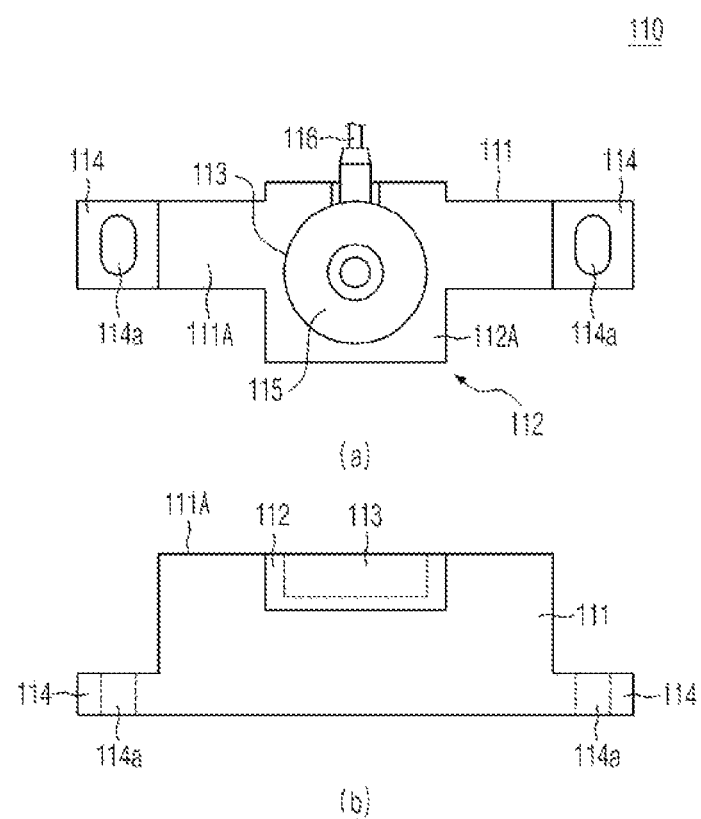

[FIG. 5]
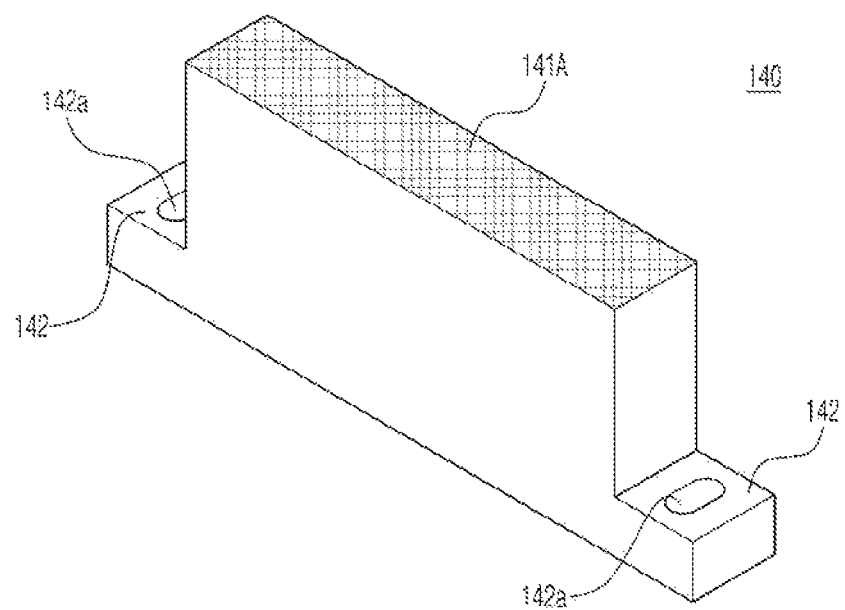

[FIG. 6]
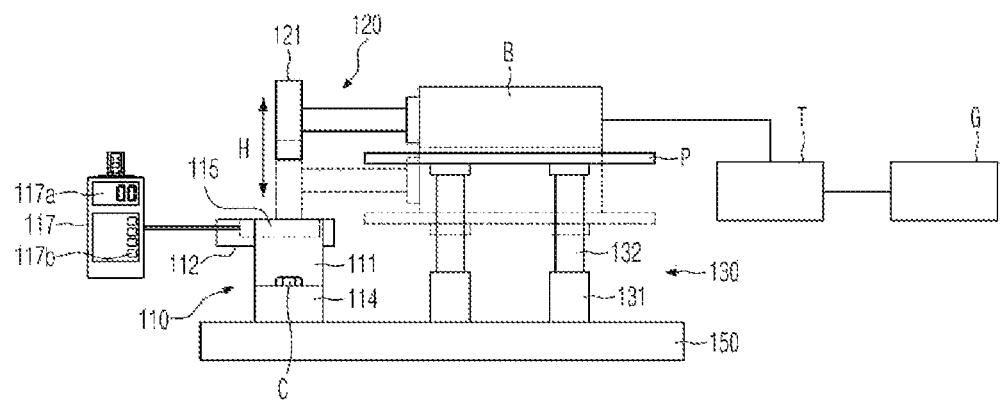

[FIG. 7]
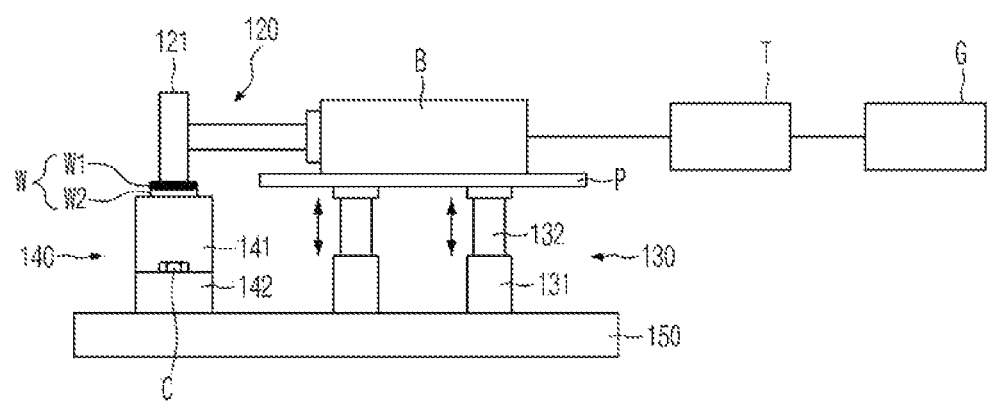

[FIG. 8]
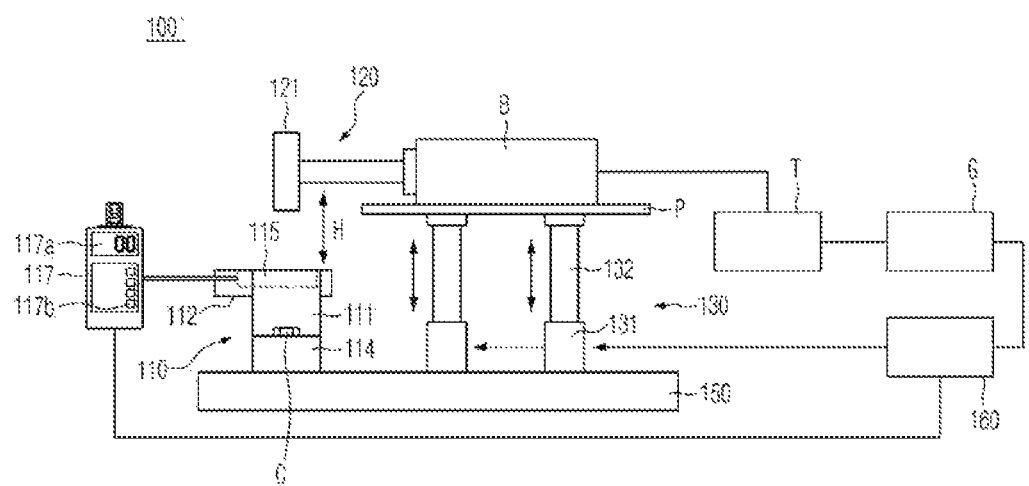

[FIG. 9]
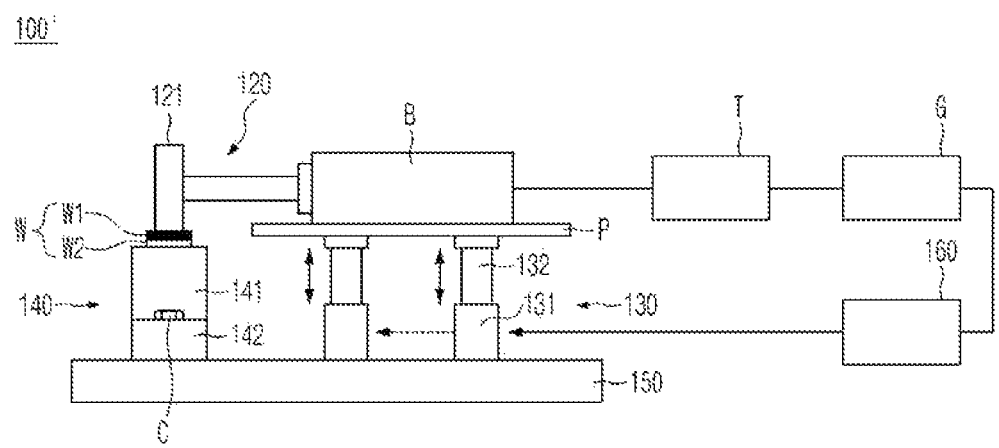

[FIG. 10]
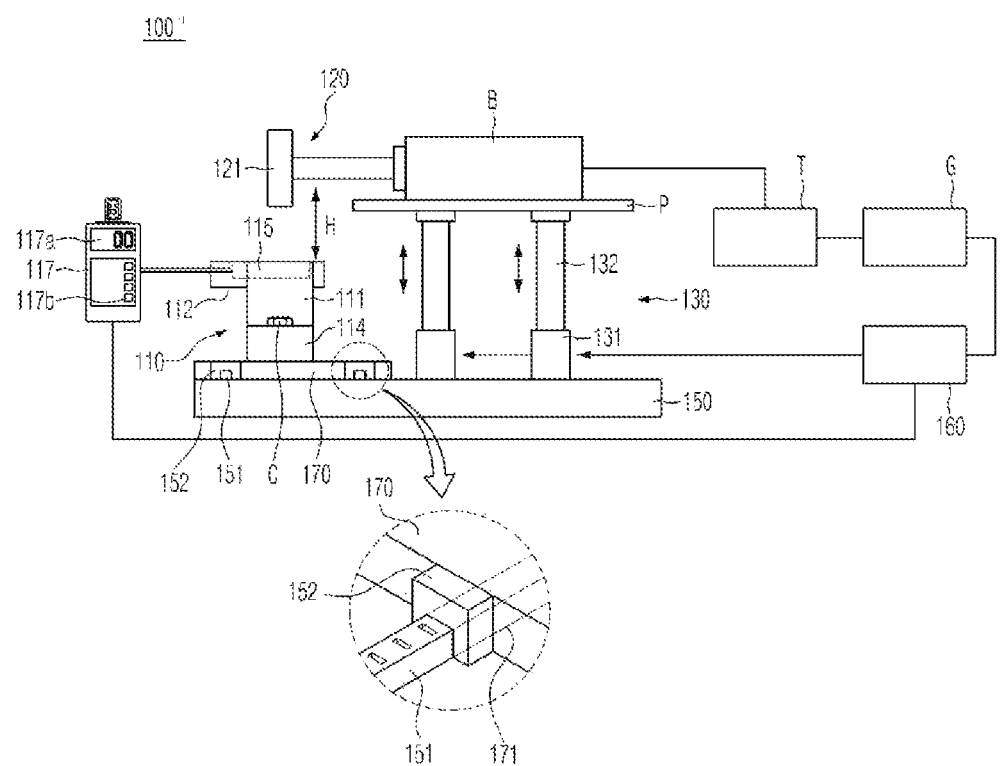

[FIG. 11]
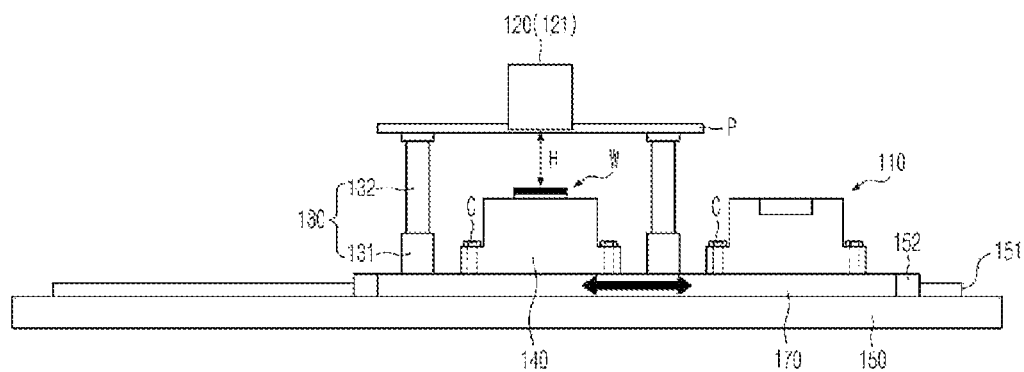

[FIG. 12]
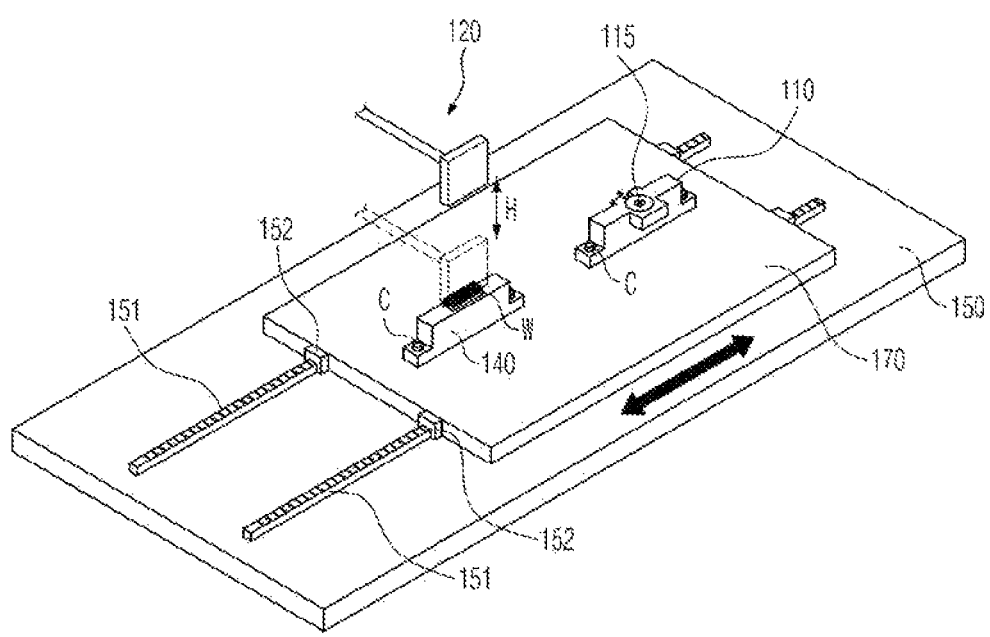

[FIG. 13]
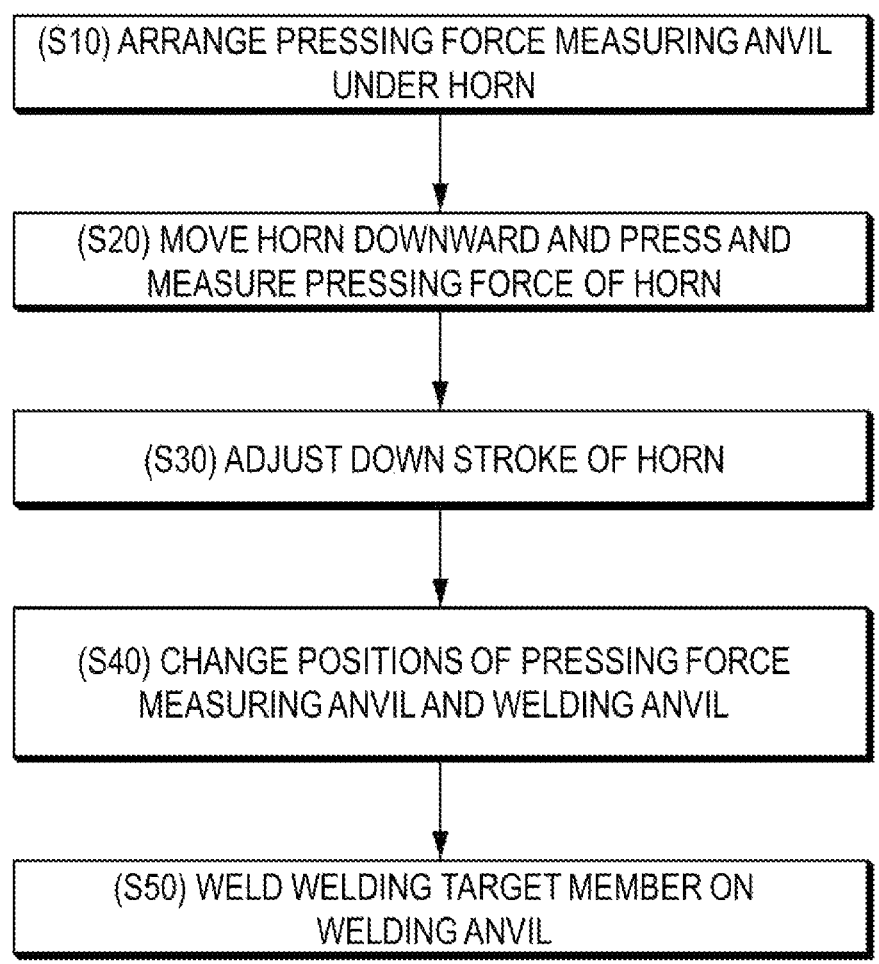

ULTRASONIC WELDING APPARATUS AND ULTRASONIC WELDING METHOD

TECHNICAL FIELD

The present invention relates to an ultrasonic welding apparatus and an ultrasonic welding method.

This application claims the benefit of priority based on Korean Patent Application No. 10-2021-0099891, filed on Jul. 29, 2021, and the entire contents of the Korean patent application are incorporated herein by reference.

BACKGROUND ART

Recently, secondary batteries capable of charging and discharging have been widely used as energy sources of wireless mobile devices. Further, the secondary batteries have been drawing attention as energy sources of electric vehicles, hybrid electric vehicles, and the like and proposed as solutions to address the air pollution of existing gasoline vehicles, diesel vehicles, and the like using fossil fuels. Accordingly, kinds of applications using the secondary batteries have diversified due to advantages of the secondary batteries, and in the future, it is expected that the secondary batteries will be applied to more fields and products than now.

One, two, three, or four battery cells are used in each small mobile device, and a battery module in which a plurality of battery cells are electrically connected or a battery pack in which a plurality of battery modules are connected is used in middle- to large-sized devices such as vehicles due to a need for high power and high capacity. Since it is preferable that a battery module with a small size and a light weight is manufactured, prismatic type batteries, pouch type batteries, or the like, which have a small weight with respect to capacity, are mainly used as battery cells of middle- to large-sized battery modules.

In the battery cell, an electrode assembly in which a plurality of unit cells are stacked is provided, and the unit cells are electrically connected by welding electrode tabs drawn out from the unit cells. Further, a bundle of the welded electrode tabs is welded to an electrode lead in order to electrically connect the battery cells or the battery cell and an external apparatus.

An ultrasonic welding method is used to weld the electrode tabs and the electrode tabs and the electrode lead.

FIG. 1 is a schematic view illustrating a process of ultrasonically welding electrode tabs and an electrode lead.

Tabs W1 drawn out from an electrode assembly are vertically stacked on an electrode lead W2 and positioned on an anvil 20 of an ultrasonic welding apparatus. A horn 10 which provides vibrations for ultrasonic welding is positioned above the anvil 20. The horn 10 moves downward to the tabs W1 and the lead W2, which are welding target members, and presses and vibrates the welding target members to ultrasonically weld the tabs and the lead.

During the ultrasonic welding, since the horn 10 welds while pressing the welding target members, welding quality is determined by a pressing force of the horn 10. For example, during ultrasonic welding, when a pressing force of the horn 10 is small, weak welding causing separation of the tabs W1 from the lead W2 can occur. Conversely, when a pressing force of the horn 10 is too large, there is a problem that the tabs or the lead is disconnected, or the horn or the anvil is worn out early.

Accordingly, during the ultrasonic welding using the horn and the anvil, it is important to maintain the pressing force of the horn within a preset range or an optimum pressing force. However, conventionally, there is no way to accurately check the pressing force of the horn. For example, even when a pressure sensor is installed on an anvil, and a pressing force of a horn is measured, since ultrasonic vibrations are applied to the horn during welding, the pressing force of the horn cannot be accurately measured. Further, since the pressing force of the horn is slightly changed whenever a welding target member is replaced or a worn horn or anvil is replaced, there is a technical problem that it is difficult to perform ultrasonic welding with uniform welding quality.

RELATED ART

Patent Document

Korean Patent Publication No. 10-2021-0037902

DISCLOSURE

Technical Problem

An object of the present invention is to provide an ultrasonic welding apparatus and an ultrasonic welding method capable of accurately measuring a pressing force of a horn and adjusting a down stroke of the horn to meet a preset pressing force.

Technical Solution

An ultrasonic welding apparatus according to the present invention includes: a pressing force measuring anvil, the pressing force measuring anvil including a pressing force measuring sensor; a horn configured to be movable up and down with respect to the pressing force measuring anvil, the horn being configured to press the pressing force measuring anvil by moving downward when the pressing force measuring anvil is located under the horn; a horn down stroke adjustment part configured to adjust a down stroke of the horn so that a pressing force of the horn is within a preset pressing force range; and a welding anvil configured to support welding target members to be welded by the horn, wherein the pressure measuring anvil is changeable with the welding anvil so that the welding anvil is positioned under the horn after the down stroke of the horn is adjusted to be within the preset pressing force range.

In a specific example, the ultrasonic welding apparatus of the present invention may further include a pressing force indicator connected to the pressing force measuring senor, the pressing force indicated may display the pressing force of the horn detected by the pressing force measuring sensor.

In a specific example, the pressing force measuring sensor may be located in a groove located in a central portion of an upper surface of the pressing force measuring anvil.

In a more specific example, the pressing force measuring anvil may include an expansion protruding portion protruding from one side or opposite sides of the pressing force measuring anvil, and the central portion of the upper surface of the pressing force measuring anvil is a central portion of an upper surface of the expansion protruding portion.

As a specific example, when the horn presses the pressing force measuring anvil, ultrasonic vibrations may not be applied to the horn.

As an example, the ultrasonic welding apparatus may further include a controller configured to compare a measured pressing force of the horn by the pressure force measuring sensor with the preset pressing force range and to control the horn down stroke adjustment part so that the pressing force of the horn is within the preset pressing force range.

Alternatively, the controller may be configured to compare the measured pressing force of the horn with a preset optimum pressing force and to repeatedly control the horn down stroke adjustment part so that the pressing force of the horn becomes the optimum pressing force.

As an example, the horn down stroke adjustment part may be a hydraulic or pneumatic cylinder, and the controller may be configured to control a hydraulic or pneumatic pressure supplied to the hydraulic or pneumatic cylinder to control the down stroke of the horn.

As another example, the horn down stroke adjustment part may be a linear moving device moved by a servomotor, and the controller may control a rotation amount of the servomotor to control the down stroke of the horn.

As another embodiment of the present invention, the pressing force measuring anvil and the welding anvil may be located below the horn and spaced a predetermined distance from each other, and the pressing force measuring anvil and the welding anvil may be movable relative to the horn so that a position of the pressing force measuring anvil and a position of the welding anvil relative to the horn are changed.

As a specific example, the ultrasonic welding apparatus of the embodiment may further include a movable plate disposed under the horn, the movable plate being movable relative to the horn, the pressing force measuring anvil and the welding anvil are located on the movable plate to be spaced apart from each other, wherein the movable plate may slidably move relative to the horn so that the position of the pressing force measuring anvil and the position of the welding anvil relative to the horn are changed.

The welding target members may be a plurality of electrode tabs extending from an electrode assembly of a secondary battery or the electrode tabs extending from the electrode assembly of the secondary battery and an electrode lead.

An ultrasonic welding method according to another aspect of the present invention includes: arranging a pressing force measuring anvil including a pressing force measuring sensor under a horn; moving the horn downward, pressing the pressing force measuring anvil, and measuring a pressing force of the horn using the pressing force measuring sensor; comparing the measured pressing force of the horn with a preset pressing force range and controlling a down stroke of the horn so that the pressing force of the horn is within the preset pressing force range; changing the pressing force measuring anvil with a welding anvil and positioning the welding anvil under the horn after the down stroke of the horn is adjusted; supporting welding target members on the welding anvil; and moving the horn by the adjusted down stroke and ultrasonically welding the welding target members on the welding anvil.

As a specific example, when the horn presses the pressing force measuring anvil, ultrasonic vibrations may not be applied to the horn.

As a specific example, the down stroke of the horn may be repeatedly adjusted until the measured pressing force of the horn becomes a preset optimum pressing force, and the horn may move downward to the welding anvil with the down stroke corresponding to the optimum pressing force and weld the welding target members.

Advantageous Effects

According to the present invention, the quality of ultrasonic welding can be improved by checking a pressing force of a horn before ultrasonic welding is performed and adjusting the pressing force to be within a preset pressing force or to become an optimum pressing force to prevent a welding failure.

BRIEF DESCRIPTION OF THE DRAWINGS

FIG. 1 is a schematic view illustrating a process of ultrasonically welding electrode tabs and an electrode lead.

FIG. 2 is a set of schematic views illustrating a configuration of an ultrasonic welding apparatus according to one embodiment of the present invention.

FIG. 3 is a schematic view illustrating a pressing force measuring anvil and a pressing force indicator which are components of the ultrasonic welding apparatus of the present invention.

FIG. 4 is a set of plan and side views illustrating the pressing force measuring anvil which is the component of the ultrasonic welding apparatus of the present invention.

FIG. 5 is a perspective view illustrating a welding anvil which is a component of the ultrasonic welding apparatus of the present invention.

FIG. 6 is a schematic view illustrating a process of adjusting a down stroke of a horn according to the present invention.

FIG. 7 is a schematic view illustrating a process of welding according to one embodiment of the present invention.

FIGS. 8 and 9 are schematic views illustrating a configuration of an ultrasonic welding apparatus according to another embodiment of the present invention.

FIGS. 10 and 11 are side and front views illustrating a configuration of an ultrasonic welding apparatus according to still another embodiment of the present invention.

FIG. 12 is a perspective view illustrating a main part of the ultrasonic welding apparatus of FIGS. 10 and 11.

FIG. 13 is a flowchart showing an order of an ultrasonic welding method according to the present invention.

DETAILED DESCRIPTION OF THE PREFERRED EMBODIMENTS

Hereinafter, the present invention will be described in detail. Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

In this application, it should be understood that terms such as "include" or "have" are intended to indicate that there is a feature, number, step, operation, component, part, or a combination thereof described in the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where still another portion is interposed therebetween. On the other hand, when a portion such as a layer, a film, an area, a plate, etc. is referred to as being "under" another portion, this includes not only the case where the portion is "directly under" the another portion but also the case where still another portion is interposed therebetween. In addition, to be disposed "on" in the present application may include the case of being disposed at the bottom as well as the top.

Meanwhile, in the present specification, "a longitudinal direction" is a direction in which an electrode lead of a battery cell protrudes.

Hereinafter, the present invention will be described in detail.

An ultrasonic welding apparatus of the present invention includes: a pressing force measuring anvil including a pressing force measuring sensor; a horn which is installed to be movable up and down above the pressing force measuring anvil and presses the pressing force measuring anvil when moving downward; a horn down stroke adjustment part capable of adjusting a down stroke of the horn so that a pressing force of the horn is within a preset pressing force range; and a welding anvil which supports welding target members, which are welded by the horn, disposed thereon and of which a position is changed to a position of the pressing force measuring anvil so that the welding anvil is positioned under the horn after the down stroke of the horn is adjusted to be within the preset pressing force range.

In the present invention, since a pressing force measuring anvil capable of measuring a pressing force of the horn is provided, the pressing force of the horn closely related to welding quality can be measured in advance. Further, since a horn down stroke adjustment part capable of adjusting a down stroke of the horn so that the pressing force of the horn measured by the pressing force measuring anvil is within a preset pressing force range is provided, the pressing force of the horn can be within the preset pressing force range. When the down stroke of the horn is adjusted so that the pressing force of the horn is within the preset pressing force range, a position of the pressing force measuring anvil and a position of the welding anvil which supports a welding target member disposed thereon are changed, the welding target member on the welding anvil is welded using the adjusted down stroke of the horn, and thus a welding failure such as weak welding can be prevented, and rapid wear of the horn and the anvil can be prevented.

DESCRIPTION OF THE PREFERRED EMBODIMENTS

First Embodiment

FIG. 2 is a set of schematic views illustrating a configuration of an ultrasonic welding apparatus 100 according to one embodiment of the present invention.

Referring to (a) of FIG. 2, the ultrasonic welding apparatus 100 of the present invention includes a pressing force measuring anvil 110 including a pressing force measuring sensor 115. The pressing force measuring sensor 115 is installed on the pressing force measuring anvil 110 and measures a pressing force transmitted from a horn 120. Specifically, the pressing force measuring sensor 115 may employ a load detection sensor such as a load cell. The load cell may convert a pressure applied to the load cell into an electric signal using a strain gauge and output the electrical signal to display the pressure. The type of the pressing force measuring sensor 115 is not specifically limited as long as it is capable of showing a numerical value of a pressure, and any type of load cell, such as, a beam load cell or a cylindrical load cell, may be used.

FIG. 3 is a schematic view illustrating the pressing force measuring anvil 110 and a pressing force indicator 117 which are components of the ultrasonic welding apparatus 100, and FIG. 4 is a set of plan and side views illustrating the pressing force measuring anvil 110 of FIG. 3.

As illustrated in FIG. 3, the present invention may further include the pressing force indicator 117 which digitizes a pressure applied to the pressing force measuring sensor 115 to output an electrical signal. The pressing force measuring sensor 115 is electrically connected to the pressing force indicator 117 through a wire 116, and the pressure applied to the pressing force measuring sensor 115 is digitized into an electrical signal which can be visually checked and displayed on a pressure display part 117a of the pressing force indicator 117. Further, the pressing force indicator 117 includes a predetermined operation button 117b. Since the load cell, that is, the pressing force indicator 117, is a generally known pressure measuring member or load measuring member, the detailed description will be omitted herein. In the present specification, although the load cell is illustrated as an example of the pressing force measuring sensor, another suitable type of pressing force measuring sensor capable of measuring a load or a pressing force of the horn may be employed in the present invention.

The pressing force measuring sensor 115 may be installed in a central portion of an upper surface of the pressing force measuring anvil 110. In the present invention, it is important to accurately measure a pressing force of the horn 120 and obtain a down stroke H of the horn 120 capable of applying a pressing force within a preset pressing force range or an optimum pressing force. Accordingly, when the pressing force measuring sensor 115 is installed on a side portion or a lower portion of the pressing force measuring anvil 110, since a pressing force of the horn may not be accurately measured, the pressing force measuring sensor 115 is installed on an upper surface 111A of the pressing force measuring anvil 110 directly pressed by the horn. Further, when the pressing force measuring sensor 115 is biasedly installed to any one side on the upper surface of the anvil, an accurate pressing force may also not be reflected, so the pressing force measuring sensor 115 is installed on the central portion of the upper surface of the anvil. To this end, as shown in FIG. 4, an installation groove 113 for installing the pressing force measuring sensor 115 is provided in the central portion of the upper surface of the pressing force measuring anvil 110.

The pressing force measuring anvil 110 may be formed in the same shape and formed of the same material as a general welding anvil. However, when a size of a welding target member is small, a size of a welding anvil is also small. Particularly, since an electrode tab or an electrode lead of a secondary battery is very small, the size of the welding anvil which welds the electrode tab or the electrode lead of the secondary battery is also relatively small. In this case, when an anvil having the same size or shape as the welding anvil is used as the pressing force measuring anvil, a space sufficient to install the pressing force measuring sensor may not be secured in the anvil. In order to secure the space in which the pressing force measuring sensor 115 is installed, a pressing force measuring anvil 110 formed in a different shape from a welding anvil 140 may be used as shown in FIGS. 3 and 4. The pressing force measuring anvil 110 includes a body portion 111, fastening portions 114 protruding from two sides of the body portion, and an expansion protruding portion 112 formed on the body portion.

As illustrated in FIG. 4, the expansion protruding portion 112 protrudes from two sides of an upper portion of the body portion 111 to provide a larger installation surface. However, the expansion protruding portion 112 may be formed in a shape protruding from one side of the upper portion of the body portion. A direction in which the expansion protruding portion 112 protrudes, a size, a shape, or the like of the expansion protruding portion 112 may be properly changed in consideration of a size or a shape of a sensor to be installed. The installation groove 113 may be formed in a central portion of an upper surface 112A of the expansion protruding portion 112, and the pressing force measuring sensor 115 may be installed in the installation groove 113. The fastening portions 114 are provided on the two side portions of the body portion 111 of the pressing force measuring anvil 110, and fastening holes 114a for installing the pressing force measuring anvil 110 on a support member, such as a base, are formed in the fastening portions. Accordingly, the pressing force measuring anvil 110 may be fixedly coupled to the support member, such as the base, through the fastening holes 114a using fastening members C such as bolts.

In a general welding anvil, an uneven portion is formed on a surface of the general welding anvil in order to press and fit a welding target member during ultrasonic vibration (see FIG. 5), since the pressing force measuring anvil 110 is not for welding, a protruding portion is not formed on the upper surface.

Referring to FIG. 2 again, the horn 120 is installed to vertically move above the pressing force measuring anvil 110. The horn 120 is for providing vibrations for ultrasonic bonding to a bonding portion of the welding target member W, and an uneven portion, which is capable of forming an indentation on an upper portion of the welding target member to effectively transmit vibrations, may be provided in a portion which comes into contact with the welding target member W. The horn 120 is also referred to as a sonotrode and includes an extension portion 121 which comes into contact with the welding target member at a leading end of the horn 120. However, the shape of the horn is only exemplary, and the present invention may also employ a horn having a different shape capable of performing ultrasonic welding. Since the horn 120 has a weight, when the horn 120 moves downward, a pressing force of the horn due to the weight may be measured. However, as necessary, a separate pressing part (not shown) may be installed on an upper portion of the horn 120 to increase a pressing force of the horn. For example, a driving cylinder driven by a separate driving part at an upper side of the horn may be employed as the pressing part and may further press the horn.

The horn 120 is connected to an ultrasonic wave generator G which generates ultrasonic waves, a transducer T which converts the ultrasonic waves into vibrations, a booster B which amplifies an amplitude of the transducer, and the like. Since the ultrasonic wave generator G, the transducer T, and the booster B are known components commonly used in the ultrasonic welding apparatus, specific descriptions will be omitted.

The horn 120 may be disposed to vertically move alone or with other ultrasonic welding members such as the booster above the pressing force measuring anvil 110. When the horn 120 moves downward toward the pressing force measuring anvil 110, and the horn presses the pressing force measuring sensor 115 (for example, the load cell) of the pressing force measuring anvil, a pressing force of the horn is measured. When the pressing force of the horn is measured by the pressing force measuring sensor, ultrasonic vibrations are not applied to the horn 120. This is because, when the ultrasonic vibrations are applied, even when the horn 120 moves downward by the same down stroke, the pressing force of the horn 120 is changed, and thus, an accurate pressing force may not be measured.

A horn down stroke adjustment part 130 is provided to adjust an up or down stroke of the horn 120. A known vertical movement apparatus may be employed as the stroke adjustment part. For example, a hydraulic or pneumatic cylinder may be installed under a support P supporting the horn 120, and a hydraulic or pneumatic pressure may be supplied to the cylinder to vertically move the horn. As an example of the pneumatic cylinder, a single acting cylinder including one air intake port or a double acting cylinder including air intake ports at an inlet side and an outlet side may be employed. Alternatively, the horn may be vertically moved using a linear moving apparatus, for example, a ball screw and a ball nut, connected to a servomotor. In this case, as necessary, a linear motion (LM) guide rail which guides movement of the linear moving apparatus and the like may be employed. Further, a vertical moving apparatus or a linear moving apparatus generally used in the art may be used as the horn down stroke adjustment part. In the present embodiment, a pneumatic cylinder 130 including a cylinder body 131 and a cylinder rod 132 is employed as the horn down stroke adjustment part.

FIG. 6 is a schematic view illustrating a process of adjusting a down stroke of the horn according to the present invention.

A pressing force of the horn 120 may be expressed by a stroke of the horn which moves downward. That is, when the horn 120 moves relatively more downward toward the welding target member, the pressing force of the horn applied to the welding target member W increases. On the other hand, when a down stroke of the horn is shorter, the pressing force of the horn applied to the welding target member decreases. That is, the pressing force of the horn 120 may be expressed as or converted into a down stroke of the horn, and the pressing force of the horn may be adjusted by adjusting the down stroke. By controlling the horn down stroke adjustment part 130 such as the hydraulic or pneumatic cylinder or the linear moving apparatus connected to the servomotor, the pressing force of the horn 120 may be within a preset pressing force range. However, to this end, the pressing force of the horn should be measured first. As described above, the pressing force of the horn 120 may be changed during vibration, and the pressing force of the horn may be changed according to the type of the welding target member W, replacement of the welding target member, or replacement of the horn or the anvil. Accordingly, as illustrated in FIG. 6, first, the horn 120 moves downward toward the pressing force measuring anvil 110 to check an (initial) pressing force of the horn. When the pressing force is outside the preset pressing force range, a pressing force of the horn may be repeatedly measured while the horn down stroke adjustment part 130 changes a down stroke of the horn. In this case, since the pressing force of the horn is displayed by the pressing force indicator 117 in real time, the down stroke of the horn 120 may be adjusted while checking whether the measured pressing force is within the preset pressing force range. For example, an operator may adjust a down stroke of the horn by checking a numerical value of a pressing force on the pressing force indicator 117 and adjusting a hydraulic or pneumatic pressure to adjust a vertical moving length of the cylinder rod 132. Alternatively, the operator may adjust a down stroke of the horn by controlling a rotation amount of the servomotor (not shown) to control a movement amount of the linear moving apparatus.

Referring to (a) of FIG. 2, along with the booster B, the horn 120 is supported by the support P, and the support P is coupled to the pneumatic cylinder 130. Specifically, the pneumatic cylinder 130 includes the cylinder body 131 and the cylinder rod 132 protruding from or inserted into the cylinder body 131, and the cylinder rod is coupled to the support P.

In order to stably support the horn 120, the pneumatic cylinder 130 is installed on the base 150. In FIG. 2, it is illustrated that, along with the pneumatic cylinder 130, the pressing force measuring anvil 110 is also installed on the base 150, but the pressing force measuring anvil 110 may also be installed on a separate support member.

The welding anvil 140 whose position of the welding anvil 140 is changed to a position of the pressing force measuring anvil 110 after the down stroke H of the horn is adjusted by the horn down stroke adjustment part 130 so that the down stroke of the horn 120 is within the preset pressing force range is provided.

FIG. 5 is a perspective view illustrating an example of the welding anvil 140 which is a component of the ultrasonic welding apparatus 100 of the present invention.

Referring to FIG. 5, the welding anvil 140 includes a body portion 141 and fastening portions 142 including fastening holes 142a which are disposed at left and right sides of the body portion and into which fastening members are inserted. Further, an uneven portion capable of forming an indentation on a lower surface of the welding target member is formed on an upper surface 141A of the body portion 141. An illustrated shape of the welding anvil is only one example, and the present invention is not necessarily limited to the anvil having the shape. Since the welding anvil is a portion on which ultrasonic welding is actually performed by the horn, the welding target member is disposed on and supported by an upper portion of the welding anvil. That is, as illustrated in FIG. 1, for example, when welding target members W include an electrode tab W1 which extends from an electrode assembly of a secondary battery and an electrode lead W2, the electrode tab and the electrode lead are stacked and positioned on the welding anvil 140.

Referring to (b) of FIG. 2, it is illustrated that the position of the welding anvil 140 is changed to the position of the pressing force measuring anvil 110, and the welding anvil 140 is installed under the horn 120. A position change or a replacement between the pressing force measuring anvil 110 and the welding anvil 140 may be manually conducted by the operator. In this case, fastening members C are removed from the fastening portions 114 of the pressing force measuring anvil 110 to remove the pressing force measuring anvil 110 from the base 150 and the like. Thereafter, the welding anvil 140 may be disposed at the position at which the pressing force measuring anvil 110 was installed, and the fastening members C may be installed in the fastening portions 142 of the welding anvil 140 to install the welding anvil 140 under the horn. However, the position change between the pressing force measuring anvil and the welding anvil may be automatically performed using a separate moving member as described below.

FIG. 7 is a schematic view illustrating a process of welding according to the embodiment of FIG. 2.

FIG. 7 shows a state in which the down stroke H of the horn is adjusted to be within the preset pressing force range, and the position of the welding anvil 140 is changed to the position of the pressing force measuring anvil 110 so that the welding anvil 140 is positioned on the base 150. In this case, a pressing force of the horn 120 is checked by the pressing force measuring sensor 115 of the pressing force measuring anvil, and the down stroke of the horn is adjusted to be within the preset pressing force range by comparing the pressing force with a preset pressing force. Accordingly, the horn 120 moves downward to the welding target member on the welding anvil 140 as much as the down stroke H corresponding to the preset pressing force. Thereafter, as illustrated in FIG. 7, the horn 120 may ultrasonically weld the welding target member W disposed on the welding anvil using the preset pressing force and ultrasonic vibrations transmitted through the wave generator G, the transducer T, and the booster B.

Second Embodiment

FIGS. 8 and 9 are schematic views illustrating a configuration of an ultrasonic welding apparatus 100' according to another embodiment of the present invention.

Referring to FIGS. 8 and 9, the ultrasonic welding apparatus 100' of the present embodiment may further include a controller 160 which compares a measured pressing force of a horn and a preset pressing force range and controls a horn down stroke adjustment part 130 so that a pressing force of the horn is within the preset pressing force range.

That is, the present embodiment includes the controller 160 which automatically controls the adjustment of a down stroke of the horn through checking of a pressing force of a horn 120. As illustrated in FIG. 8, the controller 160 may be connected to a pneumatic cylinder which is the horn down stroke adjustment part 130 and may automatically move the horn 120 downward from the pressing force measuring stage. When the controller 160 operates the horn down stroke adjustment part 130, and the horn moves downward to a pressing force measuring anvil 110, a pressing force of the horn measured by a pressing force measuring sensor 115 is displayed on a pressing force indicator 117, and the controller 160 may receive pressing force data. Further, the controller 160 may compare the measured pressing force of the horn 120 with the preset pressing force range, and when the measured pressing force of the horn is outside the preset pressing force range, may control the horn down stroke adjustment part 130. For example, when a preset pressing force range of an electrode tab and an electrode lead is in the range of 150 to 200 kgf, and a measured pressing force is smaller than 150 kgf, the controller 160 controls a hydraulic/pneumatic pressure or increases a rotation amount of a servomotor so as to increase a down stroke of the horn until a pressing force of the horn is 150 kgf. In this case, the pressing force measuring sensor 115 (a load cell) may continuously measure a pressing force of the horn according to an increase in down stroke, and the pressing force may be displayed on a display part 117a of the pressing force indicator. The controller 160 may store the down stroke of the horn when the pressing force received from the pressing force indicator is within the preset pressing force range. Alternatively, when the pressing force of the horn is greater than the preset pressing force, for example, 200 kgf, the controller 160 may decrease the down stroke of the horn to control the pressing force of the horn to be within the preset range.

Meanwhile, although the controller 160 may control a range of a pressing force of the horn as described above, the controller 160 may perform pinpoint control so that a pressing force of the horn becomes an optimum pressing force. In this case, the horn down stroke adjustment part 130 may be repeatedly controlled until a measured pressing force of the horn becomes the optimum pressing force. To this end, a down stroke H of the horn corresponding to the optimum pressing force may be obtained by repeatedly vertically moving the horn and repeatedly measuring a pressing force using the pressing force measuring sensor 115 until a measured pressing force of the horn becomes the optimum pressing force.

FIG. 9 shows a process in which, after a pressing force of the horn is within the preset pressing force range or becomes the optimum pressing force, a position of a welding anvil 140 is changed to a position of the pressing force measuring anvil 110, and welding target members W on the welding anvil are welded by the horn. Since the horn 120 moves downward as much as the down stroke H corresponding to the preset pressing force range or the optimum pressing force, presses the welding target members W on the welding anvil, and performs ultrasonic welding, the weak welding of the welding target member or excessive wear of the horn and the anvil can be prevented.

Further, in the present embodiment, since the controller 160 automatically controls the horn down stroke adjustment part 130 or the down stroke of the horn, there is an advantage of more precisely and accurately adjusting the pressing force of the horn.

Third Embodiment

FIGS. 10 and 11 are side and front views illustrating a configuration of an ultrasonic welding apparatus 100" according to still another embodiment of the present invention, and FIG. 12 is a perspective view illustrating a main part of the ultrasonic welding apparatus 100" of FIGS. 10 and 11.

The present embodiment is characterized by not only automatically controlling a down stroke of a horn through checking of a pressing force of the horn, but also automatically changing a position of a pressing force measuring anvil and a position of a welding anvil.

Referring to FIG. 10 to 12, a pressing force measuring anvil 110 and a welding anvil 140 of the present embodiment are disposed a predetermined distance from each other under a horn 120 to be movable relative to the horn. In the present embodiment, as the pressing force measuring anvil 110 and the welding anvil 140 move relative to the horn, a position of the pressing force measuring anvil and a position of the welding anvil may be changed relative to the horn.

In the present embodiment, specifically, a movable plate 170 disposed under the horn 120 and capable of slidably moving relative to the horn is provided. The pressing force measuring anvil 110 and the welding anvil 140 are fixedly installed on the movable plate 170 to be spaced a predetermined distance from each other. When an operation of adjusting a down stroke of the horn is completed by a controller 160, the movable plate 170 is slidably moved relative to the horn by an operator or a movement signal of the controller. That is, as the movable plate 170 moves, the pressing force measuring anvil 110 and the welding anvil 140 horizontally move relative to the horn at the same time, and thus the welding anvil 140 is positioned under the horn. Thereafter, the horn may be moved downward toward the welding anvil 140 as much as a down stroke corresponding to a preset pressing force or an optimum pressing force, may press welding target members W supported by the welding anvil, and may perform ultrasonic welding. When the ultrasonic welding is completed, the movable plate 170 may move to its original position again, and an operation of measuring a pressing force may be repeatedly performed by the pressing force measuring anvil 110.

Accordingly, according to the present embodiment, there is no need to dissemble the pressing force measuring anvil 110 and install the welding anvil 140 whenever a welding process is performed after a pressing force is measured and a down stroke of the horn is adjusted. The controller 160 may integrally control the measurement of the pressing force, the adjustment of the down stroke of the horn, and the movement of the pressing force measuring anvil 110 and the welding anvil 140. As necessary, the controller 160 may be connected to an ultrasonic wave generator and a transducer and may integrally control the members.

As described above, after a pressing force of the horn measured by the pressing force measuring anvil 110 is compared with a preset pressing force range or an optimum pressing force of the horn, and a down stroke H of the horn is adjusted, replacement of the pressing force measuring anvil 110 and installation of the welding anvil 140 may be manually performed by, for example, manually dissembling fastening members of fastening portions of the pressing force measuring anvil and fastening members of fastening portions of the welding anvil to a base or the like. However, this needs time and manpower, and the efficiency of automatic control of the controller 160 may be lowered. In the present embodiment, since replacement or a position change of the anvils in relation to the down stroke of the horn are automatically performed by, for example, the controller 160, the present invention may be more suitable for mass production and facility automation.

The slidable movement of the movable plate 170 relative to the horn 120 may be performed by a linear moving apparatus generally known in the machinery field. For example, as illustrated in FIGS. 10 and 12, guide rails 151 may be installed on the base 150, guide grooves 171 may be formed in a lower portion of the movable plate 170, and the movable plate 170 may be slidably moved relative to the horn 120 and the base 150. Alternatively, conversely, guide rails may be formed on the lower portion of the movable plate 170, and guide grooves may also be formed in an upper portion of the base 150. Further, it is sufficient that the movable plate 170 moves relative to the horn, and the movable plate 170 is not necessarily installed on the base 150. However, in the present embodiment, for the sake of stability of sliding movement, the movable plate 170 is installed on the base 150 on which a cylinder and the like are installed, and the movable plate is moved relative to the horn.

Stoppers 152 or fixed members which restrict a moving distance of the movable plate 170 and stops the movable plate before and after the movable plate 170 moves may be installed on the guide rails 151. FIGS. 11 and 12 show a state in which the stoppers 152 are fixed to the guide rail 151 to stop the movable plate 170 in a state in which a pressing force is measured by the pressing force measuring anvil 110, and the movable plate 170 is moved so that the welding anvil 140 is positioned under the horn. When the stoppers 152 are separated from the guide rails 151, and the welding anvil 140 is moved left relative to the horn, the pressing force measuring anvil 110 may be positioned under the horn again. In this state, the stoppers 152 may be coupled to the guide rails 151 of the base 150 to fix the positions of the pressing force measuring anvil 110 and the welding anvil 140 relative to the horn 120.

In addition to the guide rails 151 or the guide grooves 171, a servomotor and a ball screw part (not shown) may be installed on the movable plate 170 to move the movable plate 170 relative to the horn and the base. In this case, since the servomotor may restrict a moving distance of the movable plate and stops the movable plate using a rotation amount, the stoppers are not necessarily required. However, the stoppers may be installed in order to firmly fix the movable plate before and after the movable plate moves and to perform welding without shaking, In the present embodiment, although it is described that the pressing force measuring anvil 110 and the welding anvil 140 are moved relative to the horn, it may be changed so that the horn 120 is horizontally moved relative to the anvils. Further, in the present embodiment, although it is illustrated that the pressing force measuring anvil 110 and the welding anvil 140 are relatively moved in a horizontal direction crossing an extension direction of the horn, it may be changed so that the movable plate 170 is relatively moved in a direction parallel to the extension direction of the horn 120 under the horn 120. Further, a moving direction of each of the anvils or the movable plate relative to horn may be properly changed in consideration of the extension direction of the horn, an arrangement direction of the anvils, and the like.

Hereinafter, operations of an ultrasonic welding method of the present invention will be described.

FIG. 13 is a flowchart showing an order of an ultrasonic welding method according to the present invention.

First, the pressing force measuring anvil 110 including the pressing force measuring sensor 115 is disposed under the horn 120 (S10). The pressing force measuring anvil 110 may be installed at an installation position (on the base 150) under the horn using the fastening members C. Alternatively, when the movable plate 170 to slidably move relative to the horn is installed on the base 150, the pressing force measuring anvil 110 may be fixedly installed on the movable plate 170 using the fastening members C. As illustrated in FIGS. 3 and 4, the pressing force measuring anvil 110 may be formed in a different shape from a general welding anvil and may include the expansion protruding portion 112 to secure a free space in which the pressing force measuring sensor 115 is installed.

Then, the horn 120 is moved downward to press the pressing force measuring anvil 110, and the pressing force measuring sensor 115 measures a pressing force of the horn (S20). The pressing force measuring sensor 115 may be a load measuring sensor such as a load cell. Further, the pressing force measuring sensor may be connected to the pressing force indicator 117 and may digitize the pressing force of the horn and display the digitized pressing force of the horn in a numerical value in real time. The pressing force of the horn may be visually checked or transmitted to the controller.

Thereafter, the measured pressing force of the horn 120 is compared with a preset pressing force range, and a down stroke of the horn is adjusted so a pressing force of the horn is within the preset pressing force range (S30).

The down stroke of the horn may be adjusted by controlling a pneumatic or hydraulic pressure supplied to, for example, a pneumatic or hydraulic cylinder or a rotation amount of the servomotor connected to the linear moving apparatus such as the ball screw. The stroke may be manually adjusted by the operator or automatically adjusted by the controller 160.

When the measured pressing force is out of the preset pressing force range or is different from an optimum pressing force, as necessary, an operation of measuring a pressing force and an operation of adjusting a down stroke may be repeatedly performed.

After a down stroke H of the horn is adjusted, a position of the pressing force measuring anvil 110 and a position of the welding anvil 140 on which a welding target member is disposed and supported by the welding anvil 140 are changed (S40). In this case, although the position of the anvil may be manually changed, or the anvil is manually replaced, efficiency is lowered, and thus, as illustrated in FIGS. 11 and 12, the pressing force measuring anvil 110 and the welding anvil 140 may be fixedly preinstalled, and the anvils may be moved relative to the horn 120 to easily replace the anvils.

Finally, the horn 120 is moved downward by the adjusted down stroke H, vibrations are applied to ultrasonically weld welding target members W on the welding anvil (S50).

In S20, when the horn 120 presses the pressing force measuring anvil, ultrasonic vibrations are not applied to the horn. Accordingly, the pressing force of the horn can be more accurately measured without being influenced by ultrasonic waves.

In S30, the down stroke of the horn may be repeatedly adjusted until the measured pressing force of the horn 120 becomes the preset optimum pressing force. After a down stroke corresponding to the optimum pressing force is obtained through the repeated adjustment, when the horn moves downward by the down stroke to the welding anvil 140 and welds the welding target members, welding may be performed with the optimum pressing force. Accordingly, for example, weak welding between the electrode tab and the electrode lead can be prevented. Further, since the welding is performed with the optimum pressing force, a problem that the horn and the welding anvil are worn out more than necessary, the electrode tab or the lead are disconnected due to a high pressure, or the like can be prevented.

The above description is only an example describing the technical spirit of the present invention, and various changes, modifications, and replacements may be made by those skilled in the art without departing from the essential characteristics of the present invention. Therefore, the embodiments disclosed in the present invention are considered in a descriptive sense only and not for purposes of limitation, and the scope of the invention is not limited by the embodiments. It should be interpreted that the scope of the invention is defined by the appended claims and encompasses all modifications and equivalents that fall within the scope of the appended claims.

Meanwhile, in the present specification, although the terms, such as, upward, downward, left, right, forward, and rearward, which indicate directions, have been used, the terms are only for the sake of convenience in the description, and it is clear that the directions are changed according to a position of a target object or observer.

REFERENCE NUMERALS 100,100',100": ULTRASONIC WELDING APPARATUS
110: PRESSING FORCE MEASURING ANVIL
111: BODY PORTION
112: EXPANSION PROTRUDING PORTION
113: INSTALLATION GROOVE
114: FASTENING PORTION
120: HORN
121: EXTENSION PORTION
130: HORN STROKE ADJUSTMENT PART (PNEUMATIC CYLINDER)
131: CYLINDER BODY
132: CYLINDER ROD
140: WELDING ANVIL
141: BODY PORTION

142: FASTENING PORTION
150: BASE
151: GUIDE RAIL
152: STOPPER
160: CONTROLLER
170: MOVABLE PLATE
171: GUIDE GROOVE
G: ULTRASONIC WAVE GENERATOR
T: TRANSDUCER
B: BOOSTER
C: FASTENING MEMBER
P: SUPPORT

The invention claimed is:

1. An ultrasonic welding apparatus comprising:
a pressing force measuring anvil, the pressing force measuring anvil including a pressing force measuring sensor fixed in a groove located in a central portion of an upper surface of the pressing force measuring anvil and electrically connected to a pressing force indicator;
a horn configured to be movable, up and down with respect to the pressing force measuring anvil, the horn being configured to press the pressing force measuring anvil by moving downward when the pressing force measuring anvil is located under the horn;
a horn down stroke adjustment part configured to adjust a down stroke of the horn so that a pressing force of the horn is within a preset pressing force range; and
a welding anvil configured to support welding target members to be welded by the horn,
wherein the pressure measuring anvil is changeable with the welding anvil so that the welding anvil is positioned under the horn after the down stroke of the horn is adjusted to be within the preset pressing force range such that only one of the pressing measuring anvil and welding anvil is positioned under the horn at a time.

2. The ultrasonic welding apparatus of claim 1, wherein the pressing force indicator is configured to display a pressing force of the horn measured by the pressing force measuring sensor.

3. The ultrasonic welding apparatus of claim 1, wherein:
the pressing force measuring anvil includes an expansion protruding portion protruding from one side or opposite sides of an upper portion of the pressing force measuring anvil, and
the central portion of the upper surface of the pressing force measuring anvil is a central portion of an upper surface of the expansion protruding portion.

4. The ultrasonic welding apparatus of claim 1, wherein, when the horn presses the pressing force measuring anvil, ultrasonic vibrations are not applied to the horn.

5. The ultrasonic welding apparatus of claim 1, further comprising a controller configured to:
compare a measured pressing force of the horn by the pressure force measuring sensor with the preset pressing force range; and
control the horn down stroke adjustment part so that the pressing force of the horn is within the preset pressing force range.

6. The ultrasonic welding apparatus of claim 1, further comprising a controller configured to:
compare a measured pressing force of the horn by the pressure measuring sensor with a preset optimum pressing force; and
repeatedly control the horn down stroke adjustment part so that the pressing force of the horn becomes the optimum pressing force.

7. The ultrasonic welding apparatus of claim 5, wherein:
the horn down stroke adjustment part includes a hydraulic or pneumatic cylinder; and
the controller is configured to control a hydraulic or pneumatic pressure supplied to the hydraulic or pneumatic cylinder to control the down stroke of the horn.

8. The ultrasonic welding apparatus of claim 5, wherein:
the horn down stroke adjustment part includes a linear moving device moved by a servomotor, and
the controller is configured to control a rotation amount of the servomotor to control the down stroke of the horn.

9. An ultrasonic welding apparatus comprising:
a pressing force measuring anvil, the pressing force measuring anvil including a pressing force measuring sensor;
a horn configured to be movable up and down with respect to the pressing force measuring anvil, the horn being configured to press the pressing force measuring anvil by moving downward when the pressing force measuring anvil is located under the horn;
a horn down stroke adjustment part configured to adjust a down stroke of the horn so that a pressing force of the horn is within a preset pressing force range; and
a welding anvil configured to support welding target members to be welded by the horn,
wherein the pressure measuring anvil is changeable with the welding anvil so that the welding anvil is positioned under the horn after the down stroke of the horn is adjusted to be within the preset pressing force range,
wherein the pressing force measuring anvil and the welding anvil are located below the horn and spaced a predetermined distance from each other, and
wherein the pressing force measuring anvil and the welding anvil are movable together relative to the horn so that a position of the pressing force measuring anvil and a position of the welding anvil relative to the horn are changed.

10. The ultrasonic welding apparatus of claim 9, further comprising a movable plate disposed under the horn, the movable plate being movable relative to the horn, the pressing force measuring anvil and the welding anvil are fixedly located on the movable plate to be spaced apart from each other,
wherein the movable plate slidably moves relative to the horn so that the position of the pressing force measuring anvil and the position of the welding anvil relative to the horn are changed.

11. The ultrasonic welding apparatus of claim 1, wherein the welding target members include:
a plurality of electrode tabs extending from an electrode assembly of a secondary battery; or
the plurality of electrode tabs extending from the electrode assembly of the secondary battery and an electrode lead.

12. The ultrasonic welding apparatus of claim 5, wherein:
the pressing force measuring anvil and the welding anvil are located below the horn and spaced a predetermined distance from each other, and
the pressing force measuring anvil and the welding anvil are movable together relative to the horn so that a position of the pressing force measuring anvil and a position of the welding anvil relative to the horn are changed.

13. The ultrasonic welding apparatus of claim 12, further comprising a movable plate disposed under the horn, the movable plate being movable relative to the horn, the pressing force measuring anvil and the welding anvil are fixedly located on the movable plate to be spaced apart from each other,
    wherein the movable plate slidably moves relative to the horn so that the position of the pressing force measuring anvil and the position of the welding anvil relative to the horn are changed.

* * * * *